(12) United States Patent
Shugar

(10) Patent No.: US 11,316,468 B2
(45) Date of Patent: *Apr. 26, 2022

(54) WASHING SYSTEM FOR SOLAR PANELS

(71) Applicant: NEXTracker Inc., Fremont, CA (US)

(72) Inventor: Daniel Shugar, Pacifica, CA (US)

(73) Assignee: NEXTRACKER INC., Fremont, CA (US)

(*) Notice: Subject to any disclaimer, the term of this patent is extended or adjusted under 35 U.S.C. 154(b) by 59 days.

This patent is subject to a terminal disclaimer.

(21) Appl. No.: 16/842,479

(22) Filed: Apr. 7, 2020

(65) Prior Publication Data
US 2020/0304062 A1 Sep. 24, 2020

Related U.S. Application Data

(63) Continuation of application No. 16/424,197, filed on May 28, 2019, now Pat. No. 10,615,740, which is a continuation of application No. 14/746,643, filed on Jun. 22, 2015, now Pat. No. 10,305,419.

(51) Int. Cl.
| | |
|---|---|
| *B08B 3/02* | (2006.01) |
| *B08B 1/00* | (2006.01) |
| *B08B 1/04* | (2006.01) |
| *H02S 40/10* | (2014.01) |
| *F24S 40/20* | (2018.01) |
| *A46B 13/00* | (2006.01) |

(52) U.S. Cl.
CPC ............. *H02S 40/10* (2014.12); *A46B 13/00* (2013.01); *B08B 1/002* (2013.01); *B08B 1/04* (2013.01); *B08B 3/024* (2013.01); *F24S 40/20* (2018.05)

(58) Field of Classification Search
CPC .......... H02S 40/10; B08B 1/04; B08B 1/002; B08B 3/024; F24S 40/20; A46B 13/00; A46B 13/02; Y02E 10/40; Y02E 10/50
See application file for complete search history.

(56) References Cited

U.S. PATENT DOCUMENTS

| | | | |
|---|---|---|---|
| 10,305,419 B1* | 5/2019 | Shugar | .............. A46B 13/00 |
| 10,615,740 B2* | 4/2020 | Shugar | .............. B08B 1/002 |
| 2006/0048800 A1 | 3/2006 | Rast et al. | |

(Continued)

FOREIGN PATENT DOCUMENTS

| | | |
|---|---|---|
| ES | 2267393 A1 | 3/2007 |
| ES | 1074781 U | 6/2011 |

*Primary Examiner* — Alexander Markoff
(74) *Attorney, Agent, or Firm* — Weber Rosselli & Cannon LLP

(57) ABSTRACT

A method and system for cleaning an array of solar panels. The system can include an applicator apparatus configured with a plurality of cleaning devices, and an automatic position system (APS) configured with the applicator apparatus. The APS can include a first and second sensor coupled to the applicator apparatus. A controller coupled to the first and second sensor devices can be configured to adjust a position of the applicator apparatus to maintain the plurality of cleaning devices in a direction facing a solar panel to facilitate a removal of an undesired material from the solar panel, while the applicator apparatus is moved from a first position to a second position. A mobile vehicle can be configured with the applicator apparatus to move along a row of the array of solar panels to perform the method for cleaning.

13 Claims, 11 Drawing Sheets

(56) References Cited

U.S. PATENT DOCUMENTS

| | | |
|---|---|---|
| 2011/0094542 A1 | 4/2011 | Gonzalez et al. |
| 2012/0138123 A1 | 6/2012 | Newdoll et al. |
| 2013/0270459 A1 | 10/2013 | Fontani |
| 2013/0284207 A1 | 10/2013 | Vicente Pena et al. |

\* cited by examiner

DETAIL A

WASHING SYSTEM FOR SOLAR PANELS

BACKGROUND OF THE INVENTION

The present application relates generally to systems for solar panels. More specifically, embodiments of the present invention provide a system and method for cleaning ground mounted solar panels. In a specific embodiment, the system and method can be applied to a tracking system according to the present invention and is fully adjustable at each of the pillars, among other aspects. There are other embodiments as well.

As the population of the world increases, industrial expansion has led to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydroelectric plants, as well as other forms of renewable energy. Often times, home and business use of electrical power has been stable and widespread.

Most importantly, much if not all of the useful energy found on the Earth comes from our sun. Generally, all common plant life on the Earth achieves life using photosynthesis processes from sunlight. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high-grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. Additionally, solar panels become soiled and dirty, and require cleaning, which is often difficult and cumbersome. These and other limitations are described throughout the present specification, and may be described in more detail below.

From the above, it is seen that techniques for improving solar systems are highly desirable.

BRIEF SUMMARY OF THE INVENTION

The present application relates generally to systems for solar panels. More specifically, embodiments of the present invention provide a system and method for cleaning ground mounted solar panels. In a specific embodiment, the system and method can be applied to a tracking system according to the present invention is fully adjustable in at each of the pillars, among other aspects. There are other embodiments as well.

In an example, the present invention provides a method and system for cleaning an array of solar panels. The system can include an applicator apparatus configured with a plurality of cleaning devices, and an automatic position system (APS) configured with the applicator apparatus. The APS can include a first and second sensor coupled to the applicator apparatus. A controller coupled to the first and second sensor devices can be configured to adjust a position of the applicator apparatus to maintain the plurality of cleaning devices in a direct on facing a solar panel to facilitate a removal of an undesired material from the solar panel, while the applicator apparatus is moved from a first position to a second position. A mobile vehicle can be configured with the applicator apparatus to move along a row of the array of solar panels to perform the method for cleaning.

In an example, the present invention provides a method for moving a vehicle through an array of solar panels. This method can include automatically navigating the vehicle between a pair of rows of solar panels in a field by interpolating distance information by use of a proximity sensor coupled to the vehicle and spatially configured to detect a solar panel. A GPS sensor can be configured with the proximity sensor to fully automate the vehicle for cleaning in an entirely unattended mode.

Many benefits are recognized through various embodiments of the present invention. Such benefits include au effective and efficient system for cleaning solar panels that have become soiled and dirty. Maintaining cleanliness of solar panels in an array can improve performance and longevity of these solar panel systems. Using an automated system with proximity devices and an APS provides convenience and ease of cleaning with minimal risk of damage to the solar panel array. Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
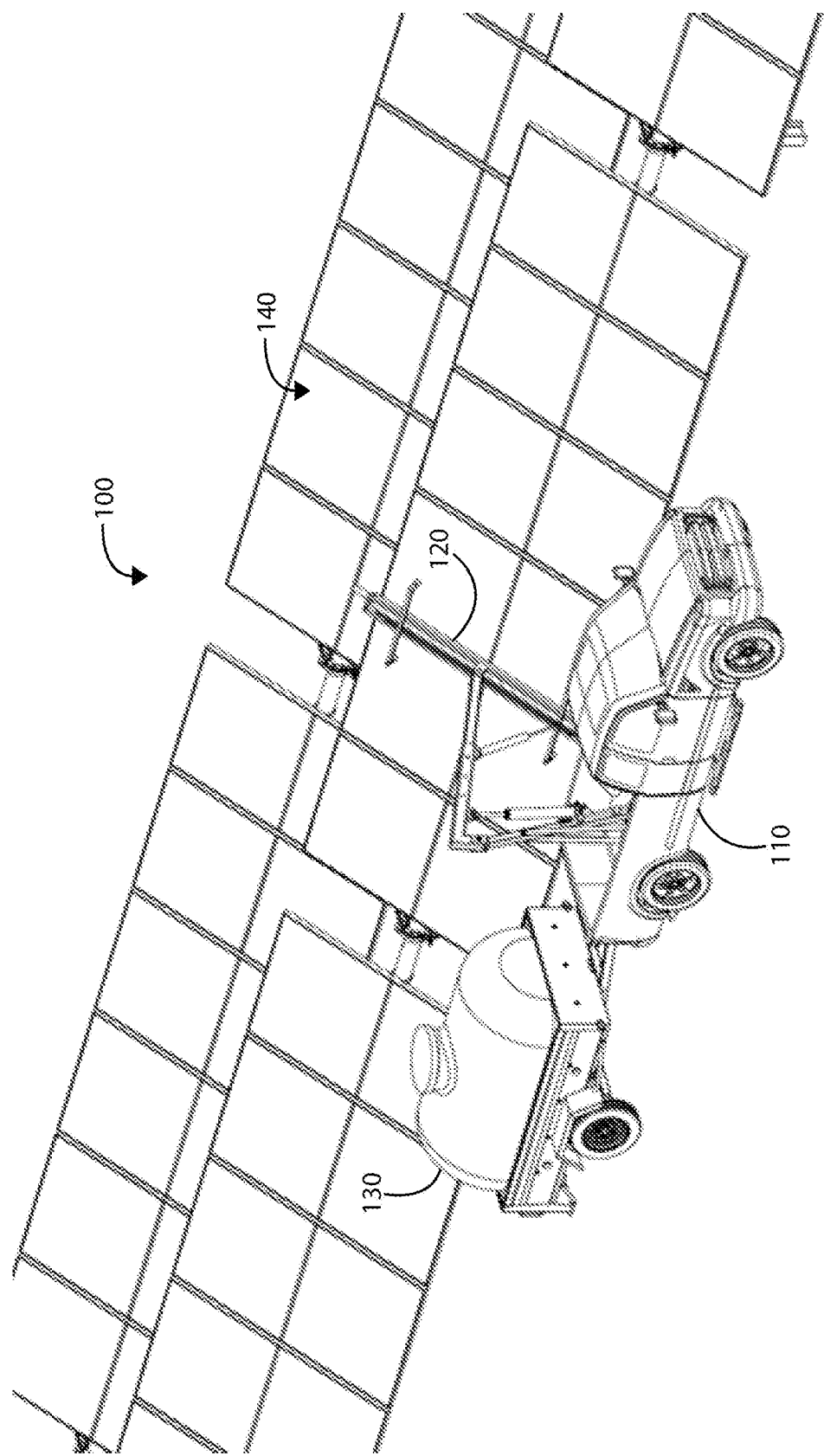
FIG. 1 is a simplified illustration of a perspective view of a vehicle system for cleaning ground mounted solar panels in an example of the present invention.

The present application relates generally to systems for solar panels. More specifically, embodiments of the present invention provide a system and method for cleaning ground mounted solar panels. In a specific embodiment, the system and method cans be applied to a tracking system according to the present invention is fully adjustable in at each of the pillars, among other aspects. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

As used herein, the terms "first" "second" "third" and "nth" shall be interpreted under ordinary meaning. Such terms, alone or together, do not necessarily imply order, unless understood that way by one of ordinary skill in the art. Additionally, the terms "top" and "bottom" may not have a meaning in reference to a direction of gravity, while should be interpreted under ordinary meaning. These terms shall not unduly limit the scope of the claims herein.

Conventional methods for cleaning these systems often employ hoses from water tracks that are manually dragged through the fields together with hand washing of panels, or, water trucks that spray one side of the panels at relatively low speeds and large volumes of water from manually operated spraying wands. Unfortunately, conventional methods are often inefficient, costly, and difficult to use. That is, ground mounted solar power systems suffered reduced energy production attributable to soiling, especially in desert environments with little rain, which is often the case. In some cases power production losses from soiling is 15%, 20%, or greater. These and other limitations have been overcome using the present techniques for cleaning solar panels.

In a preferred example, the present techniques significantly reduce water requirements and labor requirements and speeds the cleaning process for solar power systems.

FIG. 1 is a simplified illustration of a perspective view of a vehicle system 100 for cleaning ground mounted solar panels in an example of the present invention. This figure shows a mobile vehicle 110 with an applicator apparatus 120 and a storage container 130 moving along an array of solar panels 140. In an example, the storage container can include cleaning fluid, which is applied to the array of solar pads 140 via the applicator apparatus 120 as the vehicle 110 moves alongside the array.

Figure 2:
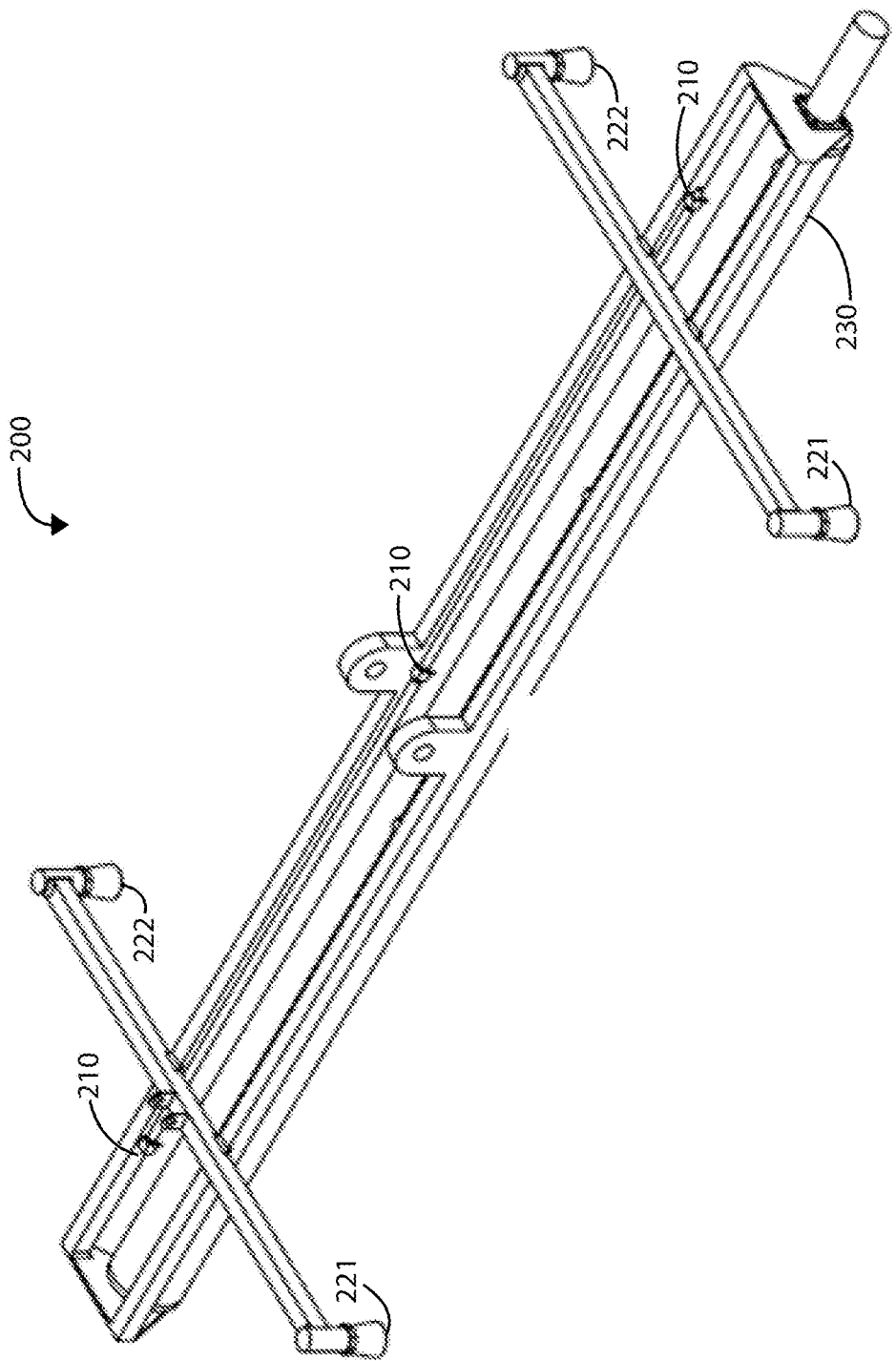
FIG. 2 is a simplified illustration of a perspective view of an applicator apparatus according to an example of the present invention.

FIG. 2 is a simplified illustration of a perspective view of an applicator apparatus according to an example of the present invention. This figure shows the applicator apparatus 200 including a plurality of cleaning devices 210 configured spatially along the applicator apparatus. The applicator apparatus 200 can also include one or more first sensor devices 221 and one or more second sensor devices 222 that are coupled thereon.

A controller can be coupled to the first and second sensor devices 221, 222. This controller can be configured to adjust a position of the applicator apparatus to maintain the plurality of cleaning devices 210 in a direction facing a solar panel to facilitate a removal of an undesired material from the solar panel. This process can occur while the applicator apparatus is moved from a first position to a second position, such as when the vehicle system moves along a row of solar panels. The first and second sensor devices can also be configured to turn on or turn off fluid from each of the plurality of cleaning devices when the mobile vehicle moves past an end of the array of solar panels to facilitate conservation of fluid.

In an example, the applicator apparatus also includes a wheel 230 configured to roll overlying a surface region of the array of solar panels such that a distance between each of the cleaning devices and the surface region is maintained using a desirable distance. In another example, one or more wheels 230 can be configured to maintain a uniform distance of the cleaning devices. The system can also include a gutter device coupled to the mobile vehicle and configured along an edge region of a solar panel in the array to catch fluid draining from the solar panel. This device can be further configured with a filtration system to recycle the collected fluid for reuse.

In an example, the system for cleaning solar panel arrays includes an automatic position system (APS) configured with the applicator apparatus. This APS can include the first and second sensor device, along with the controller configured to control these sensors. The APS can be configured to maintain a spatial distance of the plurality of cleaning devices between the mobile vehicle and the array of solar panels while the vehicle is in motion alongside the array. The APS can also be configured to maintain an angle of the applicator apparatus to accommodate for inaccuracies in movement of the mobile vehicle and errors introduced by an uneven terrain during translational movement of the vehicle. The system can also include a mechanical stop device configured with the applicator apparatus to prevent damage to any of the solar panels during a failure event of the APS or other type of failure condition. Those of ordinary skill in the art will recognize other variations, modifications, and alternatives.

Figure 3:
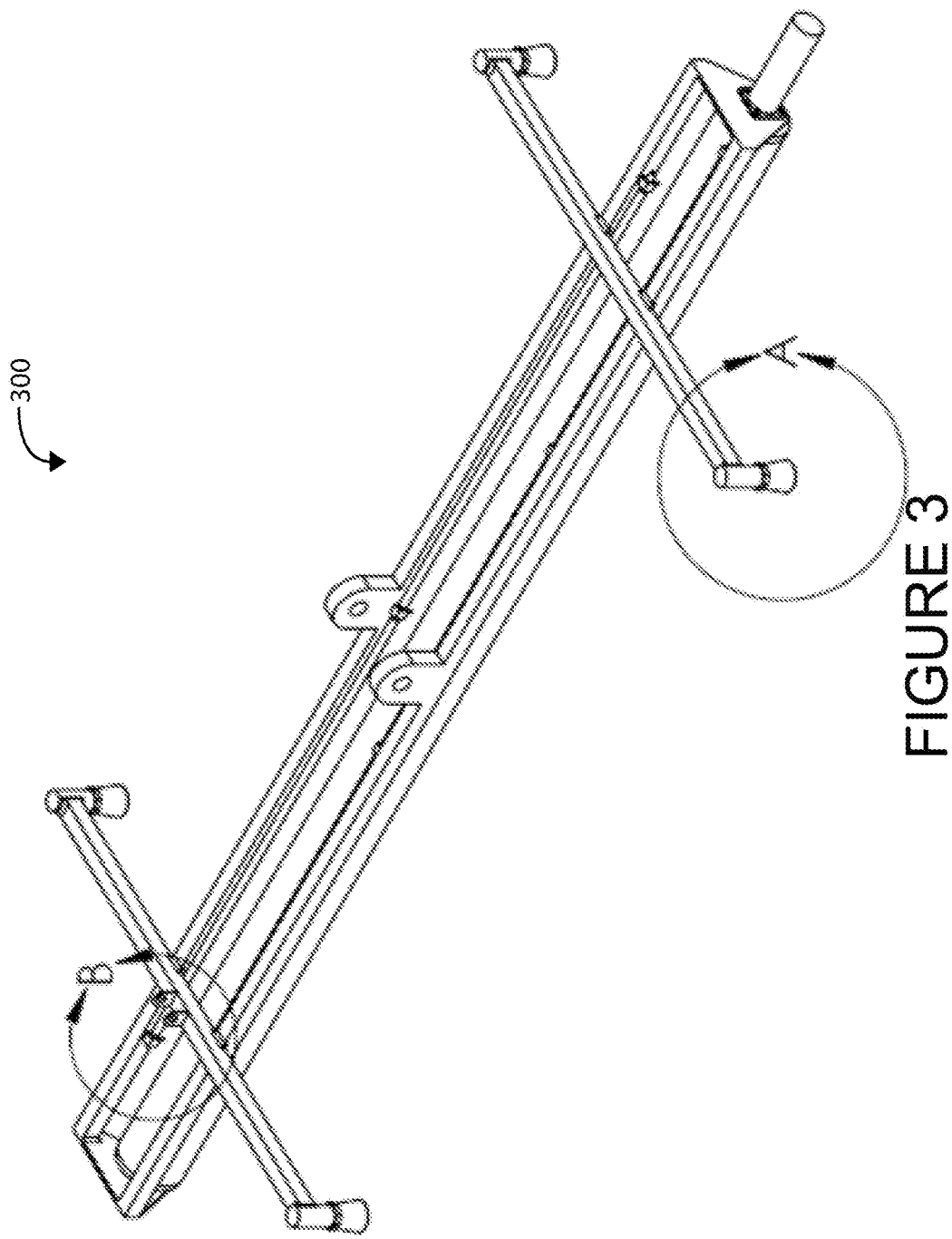
FIG. 3 is a simplified illustration of a perspective view of an applicator apparatus according to an example of the present invention.

FIG. 3 is a simplified illustration of a perspective view of an applicator apparatus according to an example of the present invention. This figure shows a similar applicator apparatus 300 as shown in FIG. 2. Here, two regions are marked: detail A and detail B. Detail A marks a region of a first sensor device or a second sensor and detail B marks a region with one of the plurality of cleaning devices.

Figure 4:
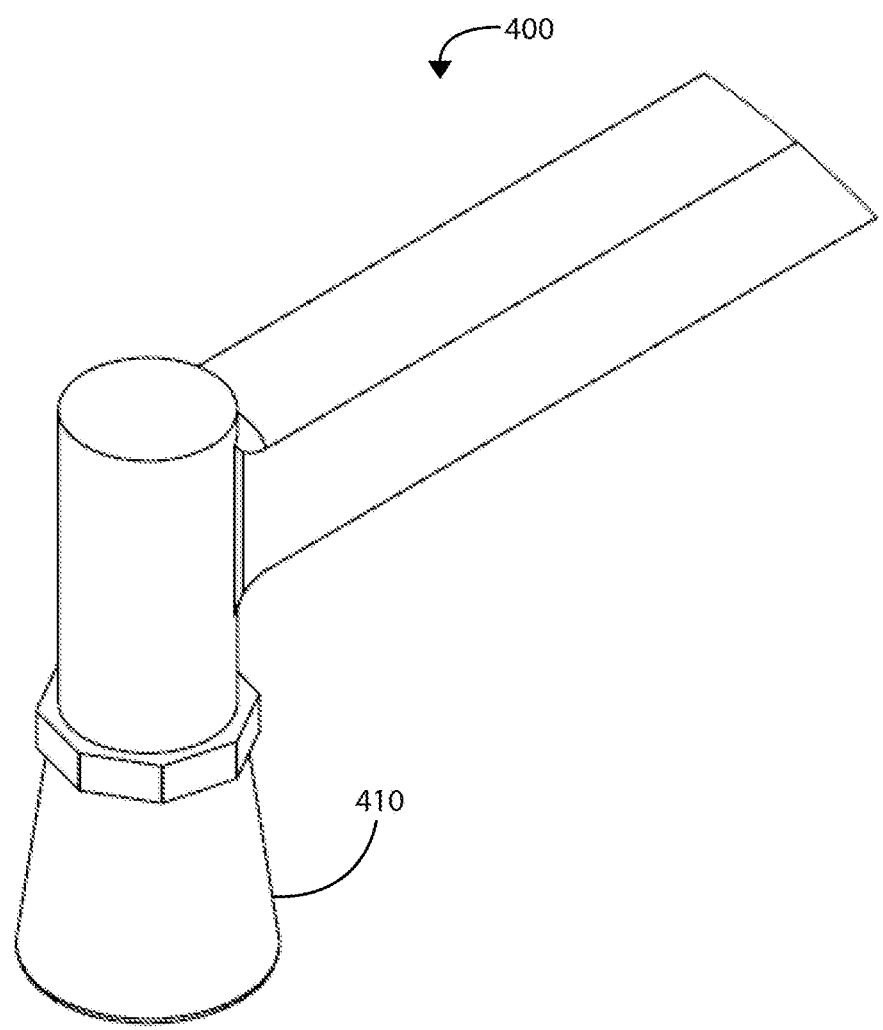
FIG. 4 is a simplified illustration of a portion of an applicator apparatus as shown previously in FIG. 3.

FIG. 4 is a simplified illustration of a portion of an applicator apparatus as shown previously in FIG. 3. This figure shows detail A, which is a region 400 showing one of a first sensor device or a second sensor device. As shown, this sensor 410 is coupled at the end of a bar structure. This sensor 410 can be a proximity sensor configured to position the plurality of cleaning devices. The sensor 410 can also be an ultrasonic sensor configured for operation at a frequency of 1 Hz or more. Other sensors may be used as well.

Figure 5:
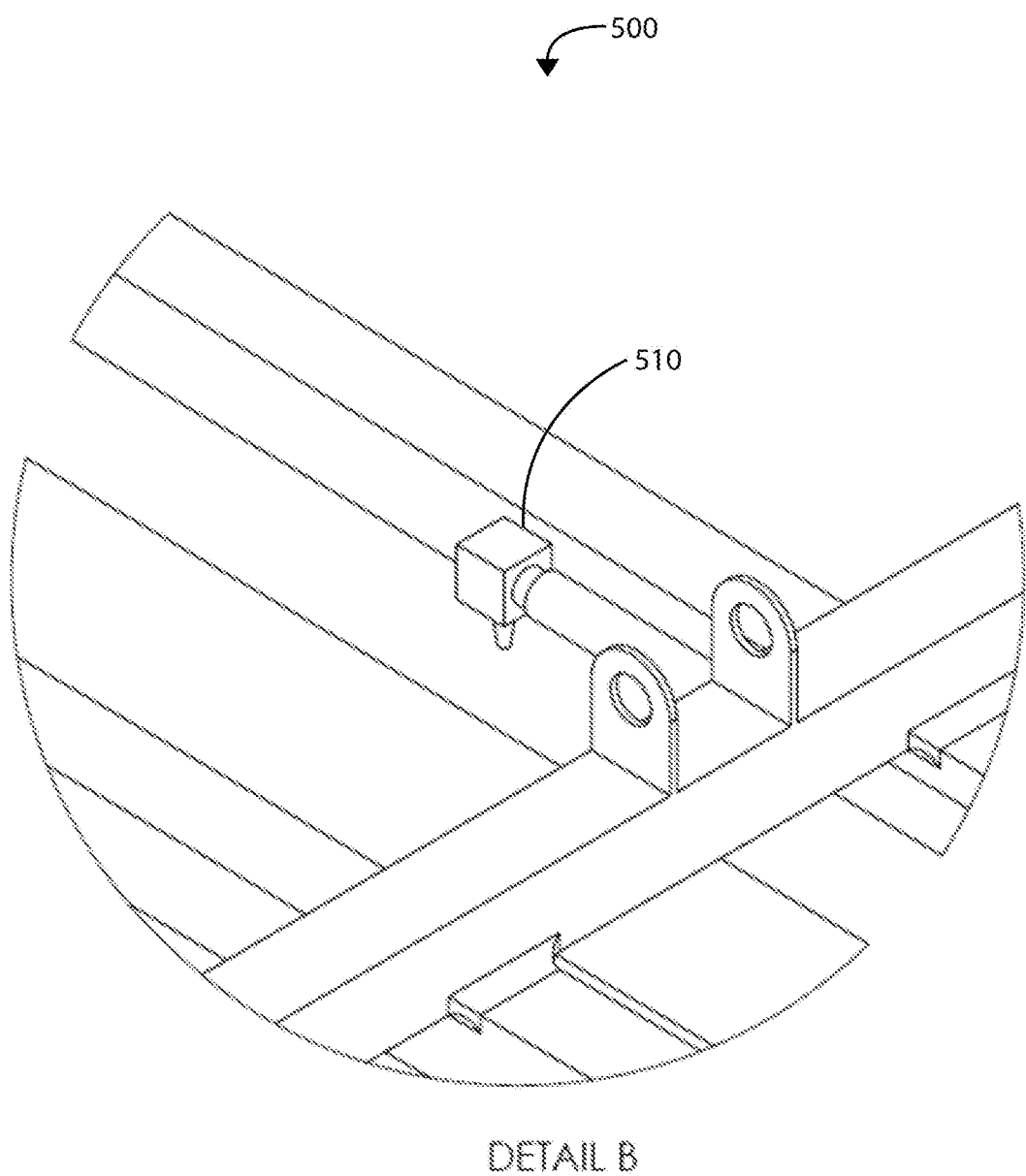
FIG. 5 is a simplified illustration of a portion of an applicator apparatus as shown previously in FIG. 3.

FIG. 5 is a simplified illustration of a portion of an applicator apparatus as shown previously in FIG. 3. The figure shows detail B, which is a region 500 showing one of the plurality of cleaning devices. As shown, each of the cleaning devices 510 can include a nozzle for a spray of cleaning fluid. The cleaning fluid can be selected from water, a surfactant, a cleaning solution with or without detergent, or other types of fluids and the like.

In an example, each of the plurality of cleaning devices includes a brush device or scrubbing device configured to physically remove an undesired material from a surface of the solar panel. This brush device can be coupled to a bar structure to facilitate the tracking of the brush device. In an example, the brush device can be cylindrical and configured to rotate about an axis to remove an undesired material from ta surface of the solar panel array. This brush device can be configured perpendicular to a direction of translational movement (i.e., perpendicular to the movement of the vehicle system or to the plane of the solar panel).

In another example, the brush device can include a length configured perpendicular to a direction of translational movement and can be spatially disposed to allow a cleaning fluid to remove the undesired material from the cylindrical brush device and/or a surface of the array of solar panels. The plurality of brush devices can include a plurality of air nozzles configured with compressed air to remove the undesired material from the brush device. These air nozzles can be configured at optimal angles to blow compressed air in order to remove the debris that is being cleaned by the brush devices. Those of ordinary skill in the art will recognize other variations, modifications, and alternatives.

Many benefits are recognized through various embodiments of the present invention. Such benefits include an effective and efficient system for cleaning solar panels that have become soiled and dirty. Maintaining cleanliness of solar panels in an array can improve performance and longevity of these solar panel systems. Using an automated system with proximity devices and an APS provides convenience and ease of cleaning with minimal risk of damage to the solar panel array.

Figure 6:
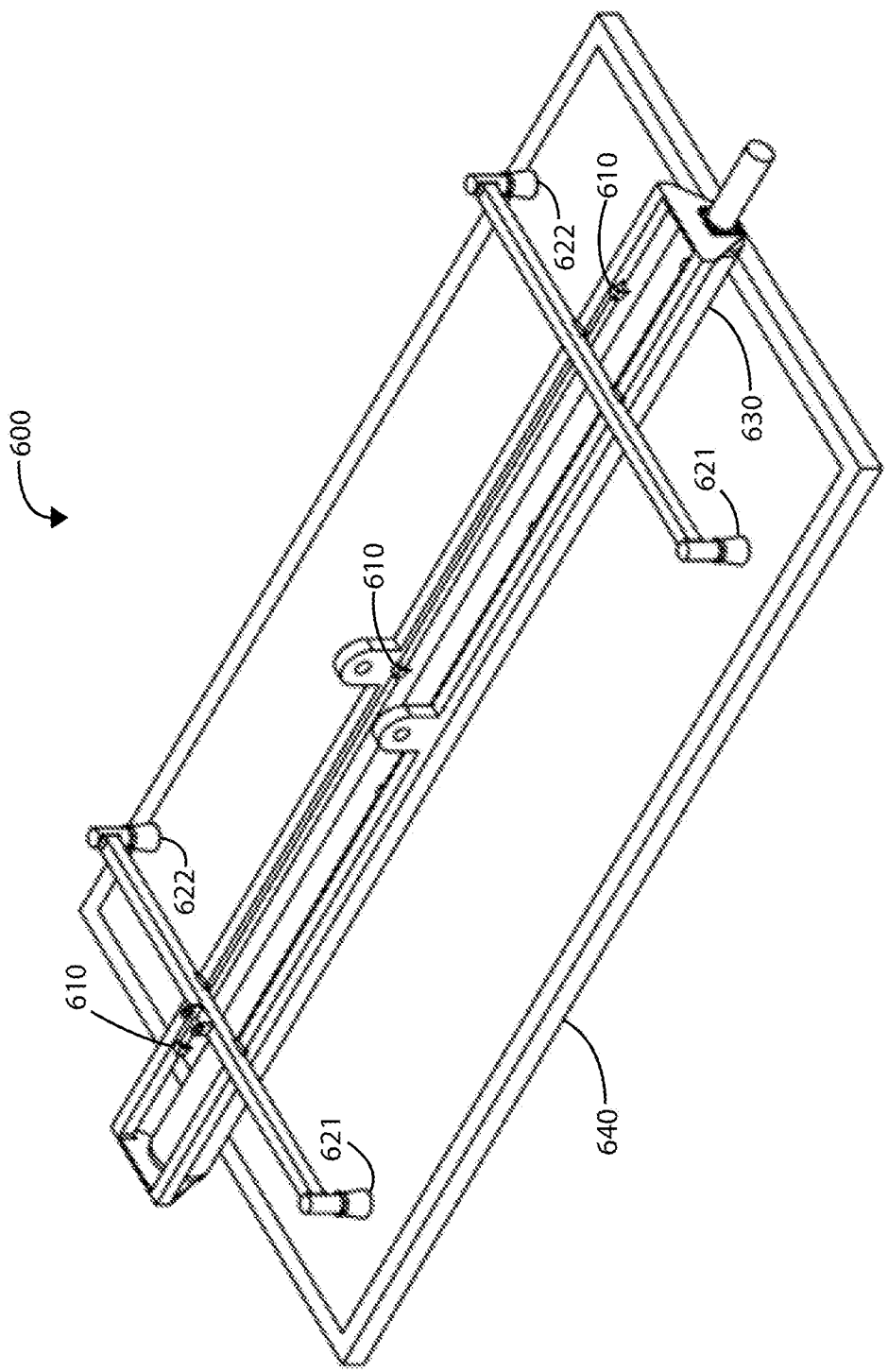
FIG. 6 is a simplified illustration of a perspective view of an applicator apparatus overlying a solar panel according to an example of the present invention.

FIG. 6 is a simplified illustration of a perspective view of an applicator apparatus overlying a solar panel according to an example of the present invention. This configuration 600 shows a similar applicator apparatus 610, as shown previously, overlying a solar panel 690. Here, first and second sensor devices 621,622 and a wheel structure 630 are shown. This view shows an example of how the applicator apparatus is positioned as the mobile vehicle of the cleaning system is moving alongside the solar panel array.

Figure 7:
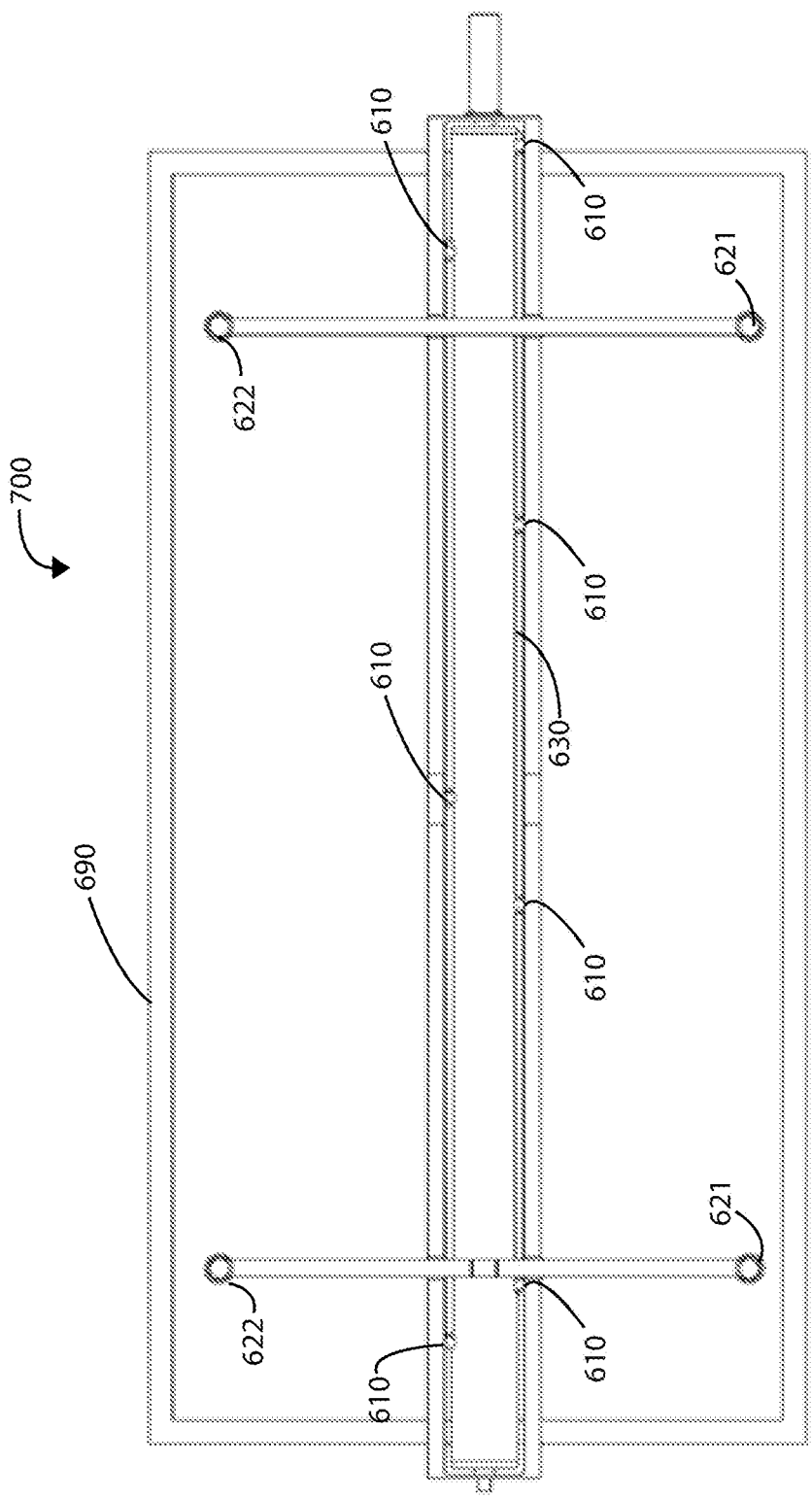
FIG. 7 is a simplified illustration of a perspective view of an applicator apparatus overlying a solar panel according to an example of the present invention.

FIG. 7 is a simplified illustration of a top view of an applicator apparatus overlying a solar panel according to an example of the present invention. This configuration 700 shows the applicator apparatus 610, as shown in FIG. 6, overlying the solar panel 690. Here, the first and second sensor devices 621,622 and the wheel structure 530 are shown.

Figure 8:
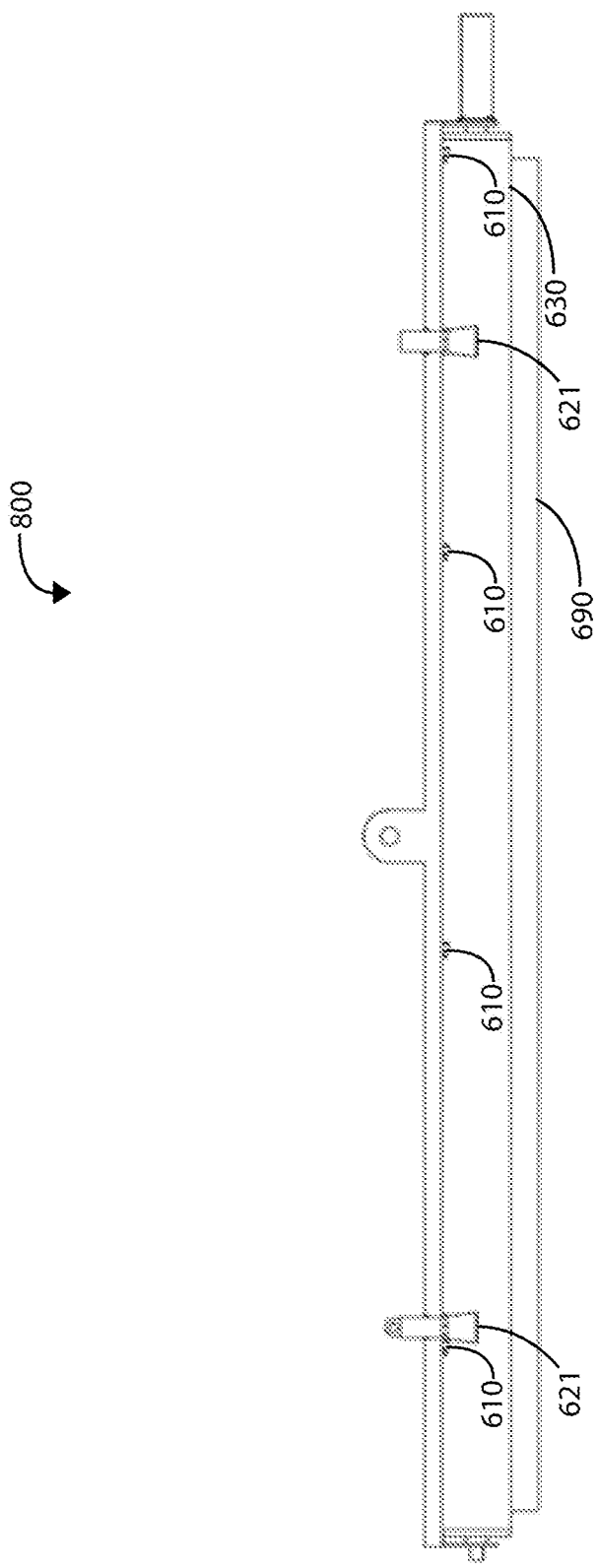
FIG. 8 is a simplified illustration of a side view of an applicator apparatus overlying a solar panel according to an example of the present invention.

FIG. 8 is a simplified illustration of a side view of an applicator apparatus overlying a solar panel according to an example of the present invention. This configuration 800 shows the applicator apparatus 610, as shown in FIG. 6, overlying the solar panel 690. Here, the sensor devices 621 and the plurality of cleaning devices 630 are shown, and the wheel structure 630 is shown maintaining a spatial distance of the applicator apparatus.

Figure 9:
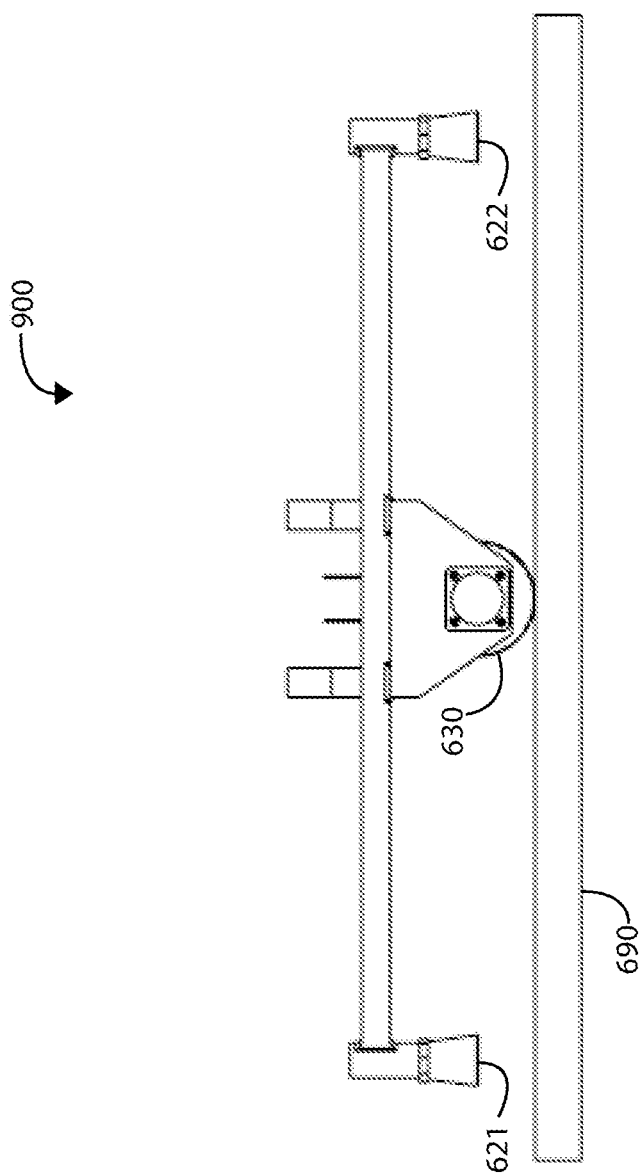
FIG. 9 is a simplified illustration of a side view of an applicator apparatus overlying a solar panel according to an example of the present invention.

FIG. 9 is a simplified illustration of a side view of an applicator apparatus overlying a solar panel according to an example of the present invention. This configuration 900 shows the applicator apparatus 610, as shown in FIG. 6, overlying the solar panel 690 from another side view compared to FIG. 8. Here, the first and second sensor devices 621,622 are shown, and the wheel structure 630 is shown maintaining a spatial distance of the applicator apparatus and the plurality of cleaning devices therein.

In an example, the present invention provides a method for moving a vehicle through an array of solar panels. This method can include automatically navigating the vehicle between a pair of rows of solar panels in a field by interpolating distance information by use of a proximity sensor coupled to the vehicle and spatially configured to detect a solar panel. A GPS sensor can be configured with the proximity sensor to fully automate the vehicle for cleaning in an entirely unattended mode.

In an example, the vehicle includes an applicator apparatus with a plurality of cleaning devices configured spatially along the applicator apparatus. The vehicle can also include an automatic position system (APS) configured with the applicator apparatus. This APS can include a first sensor device, a second sensor device, and a controller coupled to the first and the second sensor devices. The method can include adjusting, by the controller, a position of the applicator apparatus to maintain the plurality of cleaning devices in a direction facing a solar panel to facilitate a removal of an undesired material from the solar panel, while the applicator apparatus is moved from a first position to a second position.

In an example, the method further includes positioning, by the first and second sensor devices, the plurality of cleaning devices to perform a spraying process of cleaning fluid. In this case, each of the first sensor device and the second sensor device is a proximity sensor, each of the cleaning devices comprising a nozzle for the spraying of the cleaning fluid, the cleaning fluid being selected from at least one of the following: water, a surfactant, a cleaning solution with or without detergent, or a fluid.

In an example, each of the plurality of cleaning devices includes a brush device or plurality of brush devices. The brush devices can be coupled to a bar structure to facilitate tracking of the brush device. The method can include physically removing, by the brash devices, an undesired material from a surface of the solar panel array. Furthermore, the method can include maintaining a spatial distance, by the APS, of the plurality of cleaning devices between the mobile vehicle and the array of solar panels, and maintaining an angle, by the APS, of the applicator apparatus to accommodate for inaccuracies in movement of the mobile vehicle and errors introduced by an uneven terrain during translational movement of the mobile vehicle. Those of ordinary skill in the art will recognize other variations, modifications, and alternatives.

Figure 10:
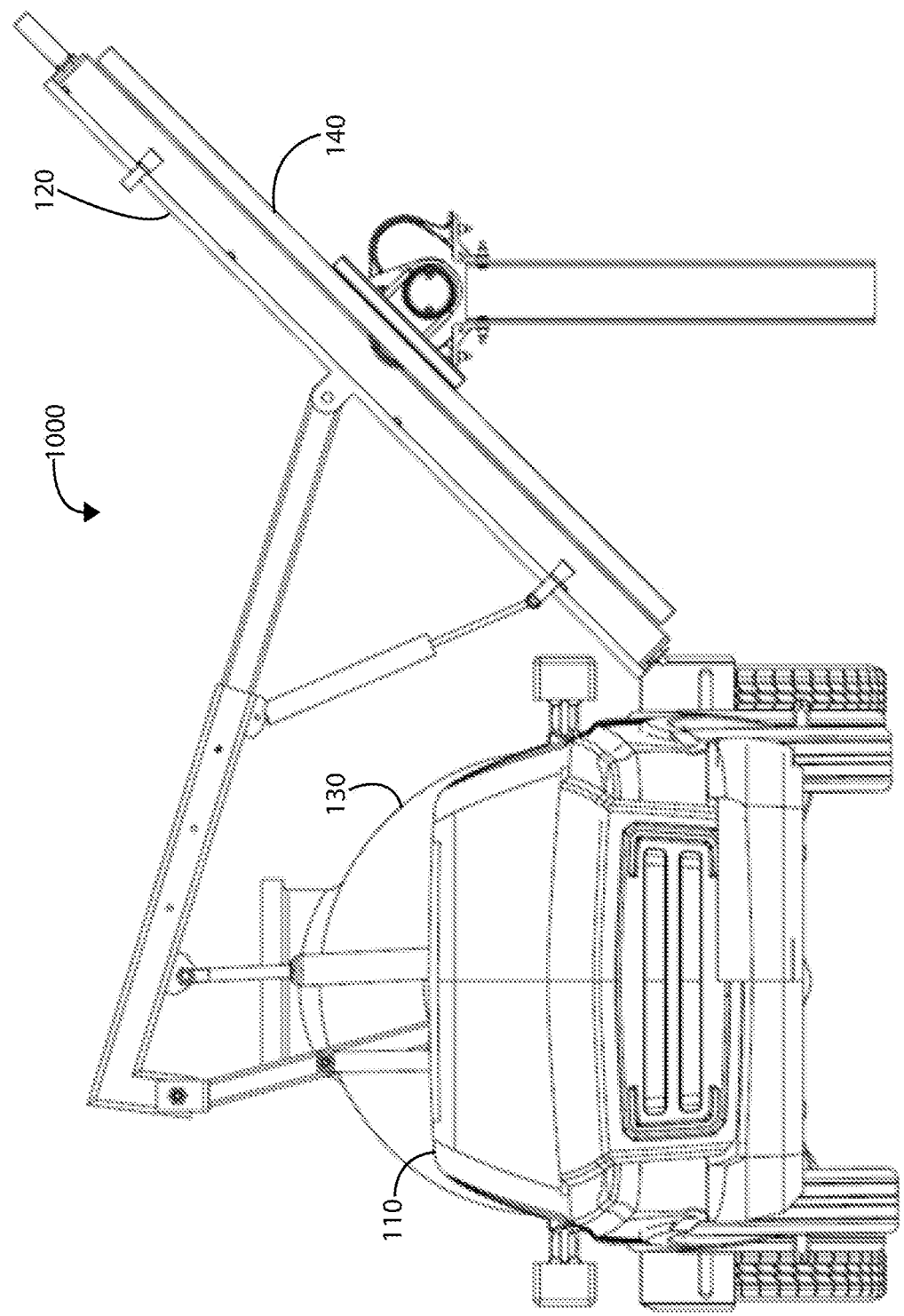
FIG. 10 is a simplified illustration of a front view of a vehicle system for cleaning ground mounted solar panels in an example of the present invention.

FIG. 10 is a simplified illustration of a front view of a vehicle system for cleaning ground mounted solar panels in an example of the present invention. This figure shows the mobile vehicle 110 with the applicator apparatus 120 and the storage container 130 moving alongside the grounded solar panel 140. In this view, the angle of the applicator apparatus configured to the plane of the solar panel can be seen much more clearly.

Figure 11:
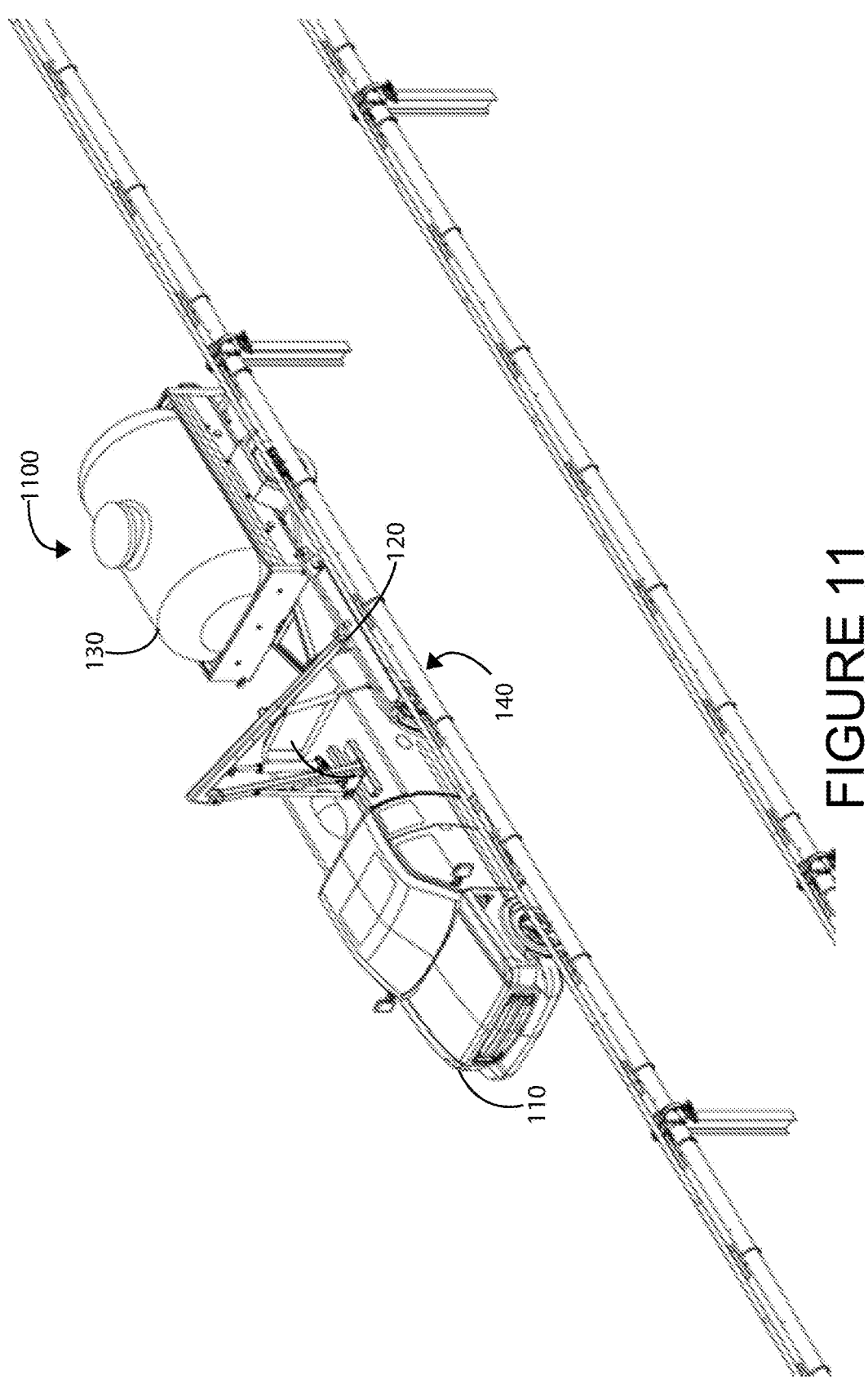
FIG. 11 is a simplified illustration of a perspective view of a vehicle system for cleaning ground mounted solar panels in an example of the present invention.

FIG. 11 is a simplified illustration of a perspective view of a vehicle system for cleaning ground mounted solar panels in an example of the present invention. This figure shows the mobile vehicle 110 with the applicator apparatus 120 and the storage container 130 moving alongside the grounded solar panel 140. In this view, the translational movement of the vehicle system across the row of solar panels in the array can be seen much more clearly.

In another example, vehicle system can include another applicator apparatus for cleaning another array of solar panels that are spatially disposed in parallel with the array of solar panels. In this case, there is a first applicator apparatus and a second applicator apparatus. While the mobile vehicle moves between the array of solar panels, the first applicator apparatus can be configured to clean a first array or first row of solar panels, and the second applicator apparatus can be configured to clean a second array or second row of solar panels.

The first row of solar panels can face the vehicle while the second row of solar panels faces away from the vehicle. In this case, the second applicator apparatus is configured to maintain a desired position using an extension arm that reaches over an upper edge of a solar panel in the second row or second array of solar panels.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A cleaning device comprising:
   an applicator including a plurality of nozzles configured to spay a cleaning fluid;
   a plurality of bars extending beyond the applicator;
   sensors, disposed at distal ends of the plurality of bars; and
   a controller coupled to the sensors and configured to adjust a position of the applicator to maintain an orientation of the plurality of nozzles facing a solar panel to facilitate removal of undesired material by the cleaning fluid.

2. The device of claim 1, wherein the sensors are ultrasonic sensors.

3. The device of claim 1, further comprising a wheel configured to roll over a surface of a solar panel and maintain a distance of the applicator from the solar panel.

4. The device of claim 1, further comprising a brush configured to physically remove undesired material from a surface of the solar panel.

5. The device of claim 4, wherein the brush is coupled to a bar structure to facilitate tracking of the brush.

6. The device of claim 4 further comprising a plurality of air nozzles configured with compressed air to remove the undesired material from the brush.

7. The device of claim 1, wherein the controller is configured to maintain an angle of the applicator to a solar panel.

8. The device of claim 1, wherein each sensor is a proximity sensor configured to position the plurality of nozzles.

9. The device of claim 1, further comprising a vehicle including an extension arm operably connected to the applicator and configured for movement along a solar tracker.

10. The device of claim 9, wherein an axis of the applicator is configured perpendicular to a direction of movement of the vehicle along the solar tracker.

11. The device of claim 9, further comprising a brush configured to physically remove undesired material from a surface of the solar panel wherein the brush has a length configured perpendicular to a direction of movement of the vehicle along the solar tracker.

12. The device of claim 9, further comprising a gutter device coupled to the vehicle and configured to capture the cleaning fluid after having been sprayed by the plurality of nozzles to clean the solar panel.

13. The device of claim 10, further comprising a storage container supported by the vehicle and configured to store the cleaning fluid and supply the cleaning fluid to the plurality of nozzles.

* * * * *